(12) United States Patent
Erickson et al.

(10) Patent No.: US 8,812,336 B2
(45) Date of Patent: Aug. 19, 2014

(54) PROVIDING REAL-TIME TEST AHEAD WORK DIRECTION FOR MANUFACTURING OPTIMIZATION

(75) Inventors: Steven C. Erickson, Rochester, MN (US); Ivory Wellman Knipfer, Rochester, MN (US); Fraser Allan Syme, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1561 days.

(21) Appl. No.: 12/166,695

(22) Filed: Jul. 2, 2008

(65) Prior Publication Data

US 2010/0004962 A1  Jan. 7, 2010

(51) Int. Cl.
*G06Q 10/00* (2012.01)

(52) U.S. Cl.
USPC ....... 705/7.12; 705/7.11; 705/7.13; 705/7.21; 705/7.25; 705/7.27; 705/7.36

(58) Field of Classification Search
USPC ................................................ 705/7.11–7.42
See application file for complete search history.

(56) References Cited

U.S. PATENT DOCUMENTS

| | | | |
|---|---|---|---|
| 5,721,686 A * | 2/1998 | Shahraray et al. | 700/102 |
| 6,716,652 B1 | 4/2004 | Ortlieb et al. | |
| 6,785,805 B1 | 8/2004 | House et al. | |
| 7,127,314 B2 | 10/2006 | Pan et al. | |
| 2002/0123874 A1 * | 9/2002 | Roesner et al. | 703/17 |
| 2002/0155628 A1 | 10/2002 | Bulaga et al. | |
| 2003/0187870 A1 * | 10/2003 | Nakajima et al. | 707/102 |
| 2004/0039561 A1 | 2/2004 | Montano et al. | |
| 2005/0033624 A1 * | 2/2005 | Dixon | 705/8 |
| 2005/0065970 A1 * | 3/2005 | King et al. | 707/102 |
| 2005/0257199 A1 * | 11/2005 | Johansson et al. | 717/126 |
| 2006/0031840 A1 * | 2/2006 | Yigit et al. | 718/102 |
| 2009/0228315 A1 * | 9/2009 | Athey et al. | 705/7 |

OTHER PUBLICATIONS

Dimopoulos, Christos, et al., Recent Developments in Evolutionary Computation for Manufacturing Optimization: Problems, Solutions, and Comparisons, IEEE Transactions on Evolutionary Computation, vol. 3, No. 2, Jul. 2000.*

* cited by examiner

*Primary Examiner* — Justin M Pats
*Assistant Examiner* — Amber A Misiaszek
(74) *Attorney, Agent, or Firm* — Yee & Associates, P.C.; Steven L. Bennett

(57) ABSTRACT

A system for generating a work unit test ahead candidate list. A list is generated of all potential candidate systems for test ahead operations. A system in the potential candidate list is selected. It is determined whether any work unit in the selected system is waiting for short parts. Determining that no work unit in the selected system is waiting for short parts, a complexity score is calculated for each work unit in the selected system. The calculated complexity scores are added to a total system complexity score. It is then determined whether an override exists for a work unit in the selected system. Determining that an override does exist, the selected system is removed from the potential candidate list. A candidate list is generated from remaining systems in the potential candidate list. Then, the candidate list is outputted to provide recommendations for optimizing work unit test ahead operations.

15 Claims, 10 Drawing Sheets

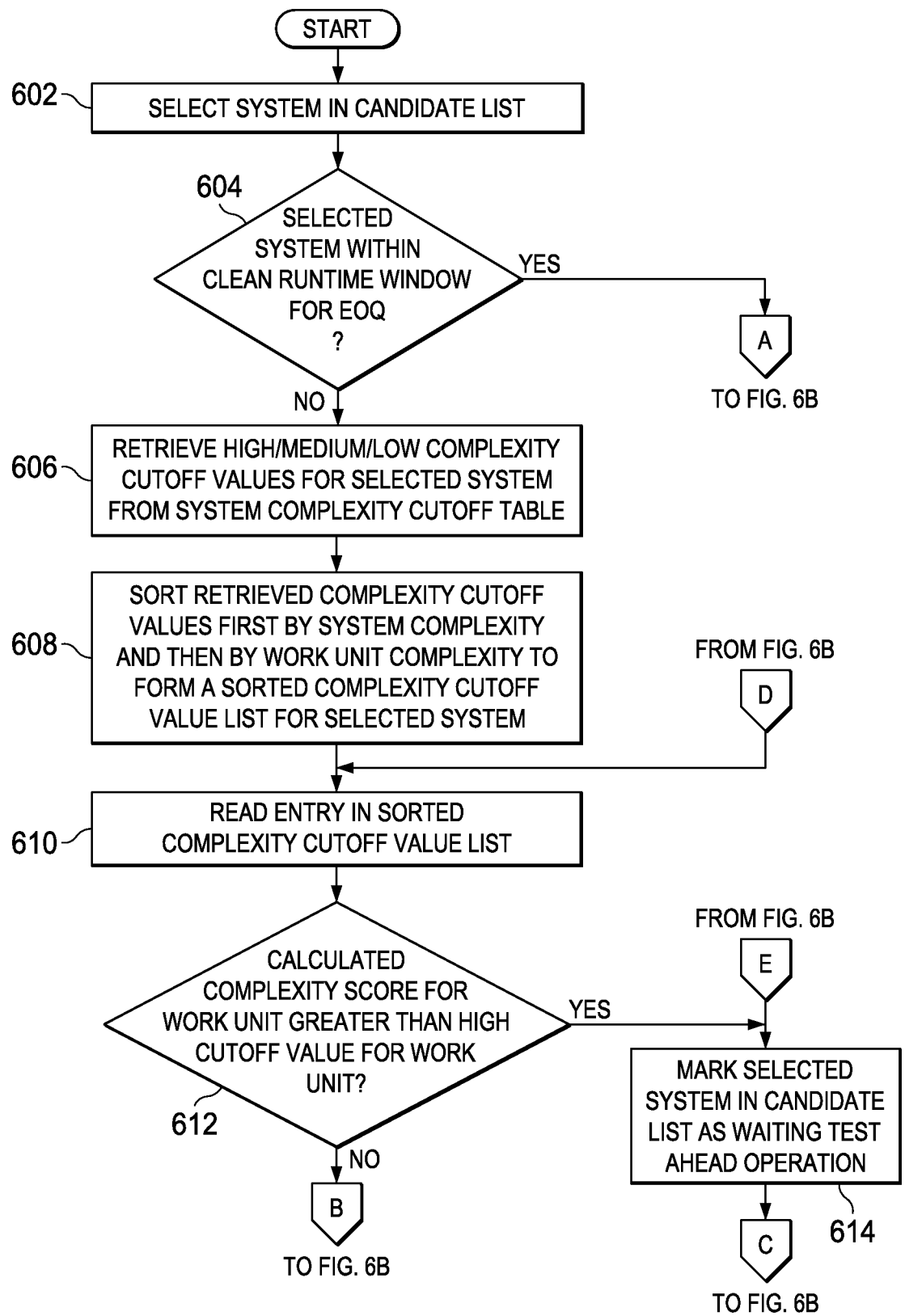

FIG. 7

COMPLEXITY DEFINITION TABLE 700

| WORK UNIT 702 | PART NUMBER 704 | BASE COMPLEXITY VALUE 706 | COMMENTS 708 |
|---|---|---|---|
| 1.8M AS | 21F1234 | 10 | SYSTEM I BENEFITS FROM SCREENING THIS PART |
| 1.8M RS | 21F1234 | 0 | PRE-TEST IS MINIMAL BENEFIT ON SYSTEM P |
| *ALL | 21F4567 | 20 | LENGTHY MICROCODE UPDATE FOR ALL BRANDS ON THIS PART MAKE IT USEFUL TO DO TEST AHEAD |

FIG. 8

SYSTEM OVERRIDE TABLE 800

| WORK UNIT 802 | OTHER PRODUCT CHARACTERISTICS 804 | ORDER NUMBER 806 | COMPLEXITY SCORE OVERRIDE 808 | COMMENTS 810 |
|---|---|---|---|---|
| 9117-ISU | | *ALL | -1 | INCOMPLETE SYSTEM UNITS NEVER HAVE SIGNIFICANT CONTENT AND RUN A SHORTER SYSTEM TEST ANYWAY |
| *ALL | | 123456 | -1 | FORCE NO WORK UNIT TEST AHEAD FOR THIS ORDER. WAS BUILT WITH PRE-TESTED PARTS |

FIG. 9

SYSTEM COMPLEXITY CUTOFF TABLE 900

| COMPLEXITY LEVEL 902 | MINIMUM COMPLEXITY SCORE 904 | COMMENTS 906 |
|---|---|---|
| WORK UNIT-LOW | 1 | MINIMAL BENEFIT TO TEST AHEAD IN MOST CASES |
| WORK UNIT-MEDIUM | 10 | MAY BE USEFUL TO TEST AHEAD DEPENDING ON SYSTEM COMPLEXITY |
| WORK UNIT-HIGH | 30 | GENERALLY WORTH TESTING AHEAD |
| SYSTEM-LOW | 1 | MINIMAL BENEFIT TO TEST AHEAD. SHOULD BE EASY FOR ONE OPERATOR TO DEBUG |
| SYSTEM-MEDIUM | 50 | SYSTEM COULD BE HANDLED BY ONE OPERATOR, BUT WITH SOME CHALLENGE |
| SYSTEM-HIGH | 100 | OVERALL SYSTEM LIKELY TO BE DIFFICULT TO DEBUG |

FIG. 10

TEST AHEAD STATE TABLE 1000

| WORK UNIT 1002 | STATE 1004 | COMMENTS 1006 |
|---|---|---|
| L4_DRAWER | COMPLETE OP 0050 | L4 DRAWERS ARE TESTABLE AFTER FINISHING OP 0050 UNIT BUILD EVEN BEFORE INTEGRATED INTO OTHER PRODUCTS. |
| *ALL | WAITING SYS_TEST OP 0111 | ALL WORK UNITS (EXCLUDING THOSE DIRECTLY SPECIFIED) HAVE TO MEET THE STATE CONDITION OF WAITING FOR SYSTEM TEST OPERATION 0111. |

FIG. 11

TEST EQUIPMENT DEFINITION TABLE 1100

| WORK UNIT 1102 | REQUIRED EQUIPMENT 1104 | PRETEST CYCLE TIME 1106 | COMMENTS 1108 |
|---|---|---|---|
| 1.8M AS | P6_CEC_I | 10 HOURS | STANDARD SYSTEM I WUTA TEST REQUIRES P6 CEC TO SUPPORT CHARLOTTE |
| 1.8M RS | P6_CEC_P | 6 HOURS | STANDARD SYSTEM P WUTA TEST REQUIRES P6 CEC TO SUPPORT CHARLOTTE |
| 9311-D11 | P6_CEC_P | 5 HOURS | WUTA WITH SQUADRONS CEC |

FIG. 12

TEST EQUIPMENT LOCATION TABLE 1200

| REQUIRED EQUIPMENT 1202 | TESTCELL 1204 | COMMENTS 1206 |
|---|---|---|
| P6_CEC_I | RCH1A301 | ECLIPZ WUTA CEC WITH FULL I/O SUPPORT |
| P6_CEC_I | RCH1A310 | ECLIPZ WUTA CEC WITH FULL I/O SUPPORT |
| P6_CEC_P | RCH1D501 | WUTA/INDEPENDENT CEC FOR SYSTEM P ORDERS (9117-MMA) |
| P6_CEC_P | RCH1D601 | WUTA/INDEPENDENT CEC FOR SYSTEM P ORDERS (9117-570) |

US 8,812,336 B2

PROVIDING REAL-TIME TEST AHEAD WORK DIRECTION FOR MANUFACTURING OPTIMIZATION

BACKGROUND OF THE INVENTION

1. Field of the Invention

The present invention relates generally to an improved data processing system and more specifically to a computer implemented method, system, and computer usable program code for providing real-time test ahead work direction to optimize manufacturing of customer orders.

2. Description of the Related Art

Typically, assembling and testing a complex customer order product entails building the physical units of work that make up the customer order and then merging these completed build entities together into a complete "system." Then, functional verification tests are run against this completed system to ensure that the system is working properly and meets the customer's specifications prior to shipment. Many factors may impact the efficiency of these functional verification tests.

For example, parts may be missing, which are needed to complete one or more of the build entities. These missing parts prevent the system from starting the functional verification testing process. In another case, a customer order may be received late in a company's financial period and may need to be tested immediately at the system level in the hope that no defects will be found and that the revenue will be contained within the same financial period.

Optimization of functional verification testing usually depends on experienced people to determine when adjustments to fixed processes should be made for manufacturing optimization. This optimization process requires skilled operators and a relatively low production volume to work properly. Even with these constraints, an individual cannot process all the information required to truly optimize overall production on a real-time basis.

Furthermore, for complex dynamic build-to-order products produced on a common manufacturing line, processes need to be clearly defined, repeatable, and flexible. With a relentless focus on product cost driving manufacturing, pressure exists to use lower-skilled workers and facilities in emerging low-cost areas. Thus, a controlled process that provides work direction and recommendations is critical to meet cost and delivery targets.

BRIEF SUMMARY OF THE INVENTION

According to one embodiment of the present invention, a work unit test ahead candidate list is generated. A list is generated of all potential candidate systems for test ahead operations. A system in the potential candidate list is selected. Required test equipment for the selected system and a location and availability of the required test equipment is determined. Then, it is determined whether any work unit in the selected system is waiting for short parts. In response to determining that no work unit in the selected system is waiting for short parts, a complexity score is calculated for each work unit in the selected system. The calculated complexity score for each work unit is added to a total system complexity score for the selected system. It is then determined whether an override exists for a work unit in the selected system. In response to determining that an override does exist for a work unit in the selected system, the selected system is removed from the potential candidate list. A candidate list is generated from remaining systems in the potential candidate list. Then, the candidate list is outputted to provide recommendations for optimizing work unit test ahead operations in a production line.

BRIEF DESCRIPTION OF THE SEVERAL VIEWS OF THE DRAWINGS

FIG. 6A and FIG. 6B is a flowchart illustrating an exemplary process for filtering and ranking candidates in accordance with an illustrative embodiment;

FIG. 7 is an exemplary illustration of a complexity definition table in accordance with an illustrative embodiment;

FIG. 8 is an exemplary illustration of a system override table in accordance with an illustrative embodiment;

FIG. 9 is an exemplary illustration of a system complexity cutoff table in accordance with an illustrative embodiment;

FIG. 10 is an exemplary illustration of a test ahead state table in accordance with an illustrative embodiment;

FIG. 11 is an exemplary illustration of a test equipment definition table in accordance with an illustrative embodiment; and FIG. 12 is an exemplary illustration of a test equipment location table in accordance with an illustrative embodiment.

DETAILED DESCRIPTION OF THE INVENTION

Figure 1:
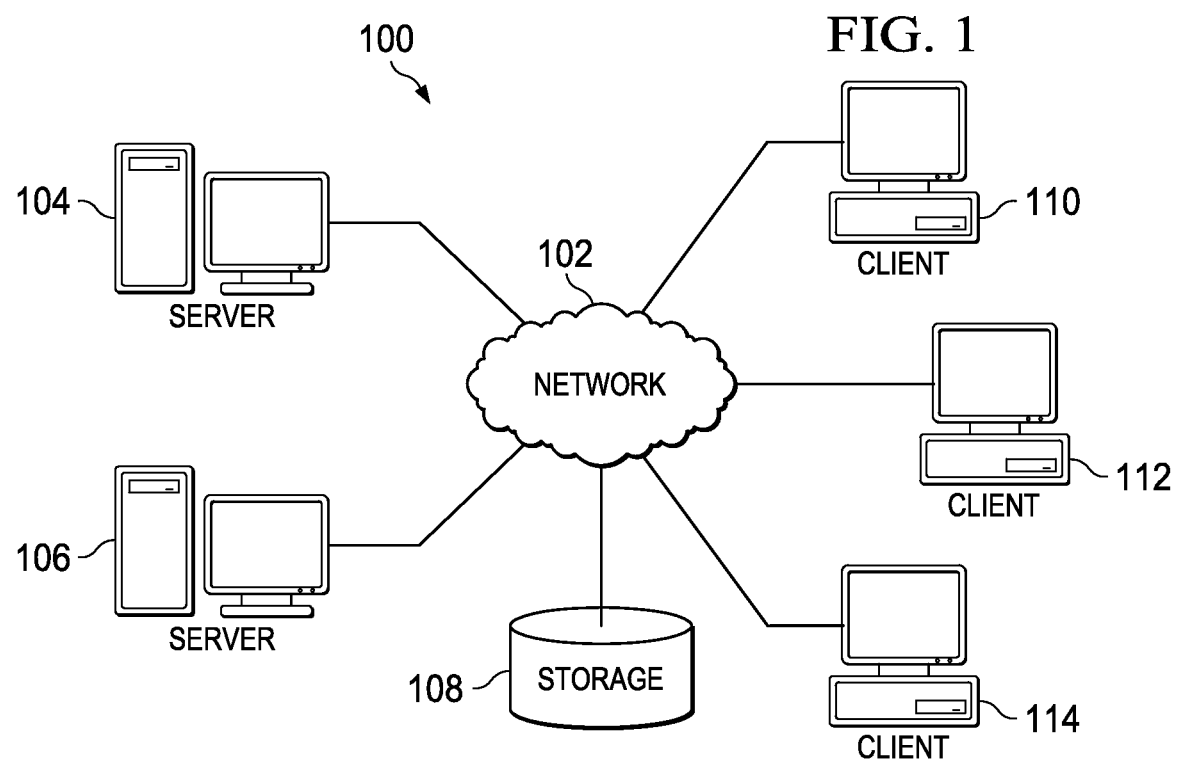
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
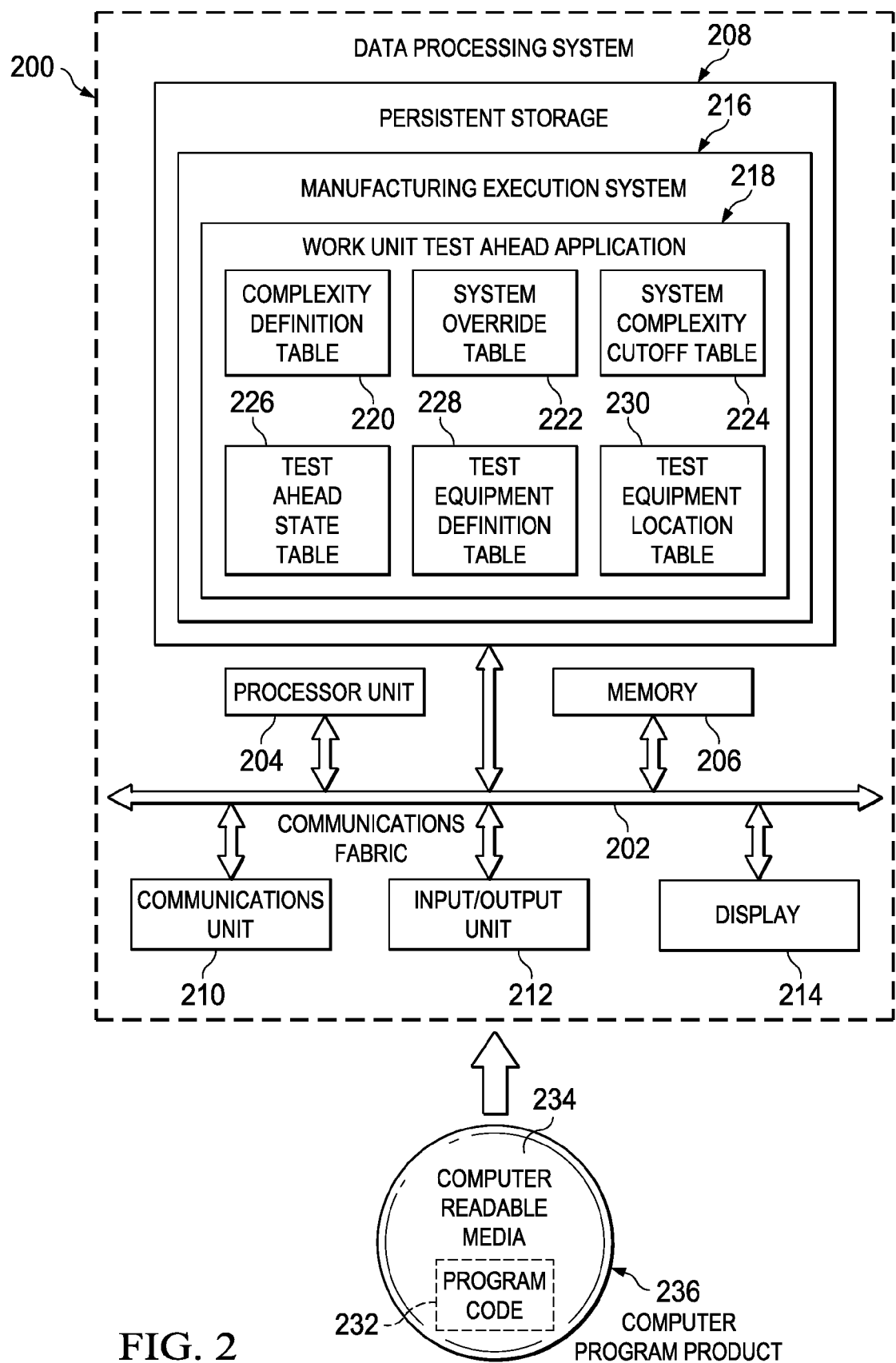
FIG. 2 is a diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to data processing environments in which different illustrative embodiments may be implemented. Many modifications to the depicted environments may be made.

FIG. 1 depicts a pictorial representation of a network of data processing systems in which illustrative embodiments may be implemented. Network data processing system 100 is a network of data processing systems, such as, for example, computers and other devices, in which the illustrative embodiments may be implemented. Network data processing system 100 contains network 102. Network 102 is the medium used to provide communications links between the various computers and other devices connected together within network data processing system 100. Network 102 may include connections, such as wire, wireless communication links, or fiber optic cables.

In the depicted example, server 104 and server 106 connect to network 102, along with storage unit 108. Storage 108 represents any type of storage device that is capable of storing data in a structured or unstructured format. Also, storage 108 may represent a plurality of storage units coupled to network 102. Storage 108 may, for example, be a database that stores production data for one or more manufacturing operations.

Further, client devices 110, 112, and 114 also connect to network 102. Client devices 110, 112, and 114 may, for example, be programmable logic controllers, personal computers, and/or network computers. A programmable logic controller (PLC) or programmable controller is a digital computer used for automation of industrial processes, such as control of machinery on factory assembly lines.

Client devices 110, 112, and 114 are clients to server 104 and/or server 106 in this example. Server 104 and server 106 provide data streams containing production information to client devices 110, 112, and 114. Furthermore, server 104 and server 106 may provide other data, such as boot files, operating system images, and applications to client devices 110, 112, and 114. Moreover, network data processing system 100 may include additional servers, clients, and other devices not shown.

Of course, network data processing system 100 may be implemented as a number of different types of networks, such as, for example, an intranet, a local area network (LAN), a wide area network (WAN), or the Internet. Also, is should be noted that FIG. 1 is only intended as an example and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes of the illustrative embodiments may be located. In this illustrative example, data processing system 200 includes communications fabric 202, which provides communications between processor unit 204, memory 206, persistent storage 208, communications unit 210, input/output (I/O) unit 212, and display unit 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip.

As another illustrative example, processor unit 204 may be a symmetric multi-processor system containing multiple processors of the same type.

Memory 206, in these examples, may be, for example, a random access memory (RAM) or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208. In addition, persistent storage 208 may represent a plurality of persistent storage units.

Persistent storage 208 contains manufacturing execution system (MES) 216. MES 216 is a factory floor control system used to manage and monitor work-in-process on the factory floor. Plant managers and production personnel use MES 216 to support collaborative manufacturing strategies that are designed to integrate disparate data streams, such as customer orders, receipt of goods, shipping, quality control, maintenance, scheduling, and other related tasks, from a company's supply chain, factory floor, and enterprise resource planning (ERP) system. MES 216 is designed to improve asset productivity, reduce order-to-ship times, and eliminate costly rework. MES 216 treats cycle-time, which is the total time required to produce a customer order, as a key performance indicator (KPI).

Machine monitoring sensors and shop floor data collection terminals transmit production data from the factory floor to MES 216. MES 216 includes supervisory control and data acquisition features to collect this production data from the machine-mounted sensors and then provides this production data to data processing system 200 for processing. In turn, software applications, such as work unit test ahead application 218, may send real-time instructions to devices, such as PLCs, to control production operations or provide real-time recommendations to users, such as production personnel, to optimize manufacturing operations.

In this illustrative example, MES 216 includes work unit test ahead application 218. Work unit test ahead application 218 may, for example, be a plug-in application for MES 216. Alternatively, work unit test ahead application 218 may be a stand-alone application. Users may utilize work unit test ahead application 218 to optimize work unit test ahead operations for manufacturing customer orders or to make recommendations for manufacturing optimization of test ahead operations. Work unit test ahead application 218 may, for example, use production data collected by MES 216 to make optimization recommendations and/or to automatically implement changes in the production line during the manufacturing process. However, it should be noted that work unit test ahead application 218 may utilize production data from a plurality of local and remote sources.

A work unit is a unit of work, such as an assembly or sub-assembly comprised of a plurality of parts, which is used in the production of a customer order. An assembly may, for example, be a blade server that will be placed in a rack of blade servers. A sub-assembly may, for example, be a network card that will be placed within a computer. A plurality of work units comprise a complete system or customer order.

Test ahead is a process of functionally testing certain work units prior to these work units being incorporated into a system. Performing this test ahead process on certain work units may save defect correction or "debug" time by isolating defects before a runtime of a complete system and may prevent bigger problems from occurring later in the manufacturing process of customer orders. Test cycle time is a combination of test runtime and debug time.

In this illustrative example, work unit test ahead application 218 includes a plurality of tables. Alternatively, these tables may be stored in a separate storage device, such as storage 108 in FIG. 1. Work unit test ahead application 218 uses these tables for calculating, filtering, and ranking operations to provide optimization recommendations and/or implement the recommendations automatically on the production line. These tables include complexity definition table 220, system override table 222, system complexity cutoff table 224, test ahead state table 226, test equipment definition table 228, and test equipment location table 230. However, it should be noted that illustrative embodiments may use more or fewer tables to perform the processes of the illustrative embodiments.

Work unit test ahead application 218 uses complexity definition table 220 to define a base complexity value associated with a particular part number, which is associated with a certain type of work unit. Work unit test ahead application 218 uses system override table 222 to define a complexity score override value associated with a particular customer order number, which is associated with a certain type of work unit. Work unit test ahead application 218 uses system complexity cutoff table 224 to define minimum complexity scores associated with particular work unit and system complexity levels. Work unit test ahead application 218 uses test ahead state table 226 to define a state of production for a particular work unit. Work unit test ahead application 218 uses test equipment definition table 228 to define the required equipment to test a particular work unit, along with the required pretest, or test ahead, cycle time for that particular type of work unit. Finally, work unit test ahead application 218 uses test equipment location table 230 to define the location and availability of the required equipment to test a particular work unit.

Communications unit 210, in these examples, provides for communications with other data processing systems or devices, such as, for example, server 104 in FIG. 1. In these examples, communications unit 210 is a network interface card. Communications unit 210 may provide communications through the use of either, or both, physical and wireless communications links.

Input/output unit 212 allows for input and output of data with other devices that may be connected to data processing system 200. For example, input/output unit 212 may provide a connection for user input through keyboard. Display unit 214 provides a mechanism to display information to a user of data processing system 200.

Instructions for the operating system and applications or programs are located on persistent storage 208. The instructions for the operating system and applications or programs may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different illustrative embodiments may be embodied on different physical or tangible computer-readable media, such as memory 206 or persistent storage 208.

Program code 232 is located in a functional form on computer-readable media 234 and may be loaded onto or transferred to data processing system 200 for execution by processor unit 204. Program code 232 and computer-readable media 234 form computer program product 236 in these examples. In one example, computer-readable media 234 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 234 also may take the form of a persistent storage, such as a hard drive or a flash memory that is connected to data processing system 200. The tangible form of computer-readable media 234 is also referred to as computer-recordable storage media.

Alternatively, program code 232 may be transferred to data processing system 200 from computer-readable media 234 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different illustrative embodiments may be implemented. The different illustrative embodiments may be implemented in a data processing system including components in addition to, or in place of, those illustrated for data processing system 200. Other components shown in FIG. 2 may be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub, which may be present in communications fabric 202.

Illustrative embodiments provide a computer implemented method, system, and computer usable program code for generating and outputting a candidate list to provide recommendations for optimizing work unit test ahead operations in a production line. Illustrative embodiments analyze, for example, product complexity, resource availability, and inventory status and outlook to discover work unit test ahead routing optimizations in the product line. Illustrative embodiments provide an automated real-time process for detecting situations where business as usual (BAU) test routings of complex systems are not optimal and for determining new test ahead procedures to optimize manufacturing of customer orders. Illustrative embodiments base work direction on monitoring a number of production variables that are relevant to specific products and processes. Production variables include, for example, product complexity, work unit build status, part availability and scheduling, scheduled ship date, financial period cutoffs, such as end of fiscal quarter, staffing levels, current production levels, production capacity, and equipment availability.

Illustrative embodiments ensure that human and physical resources are employed in the most efficient manner depending on the particular production situation. Also, illustrative embodiments utilize production idle time, such as when a particular system is waiting for one or more parts, to test ahead certain work units of the customer order. By utilizing idle production capacity or equipment, the test ahead process is virtually a free activity that may eliminate future "critical path" production gates. In addition, illustrative embodiments may "weed out" defects before a "system level" test can be started on the customer order. As a result, illustrative embodiments may minimize the actual total cycle time for customer orders.

Illustrative embodiments optimize the cycle time of customer orders by avoiding unnecessary testing and the related setup and teardown of testing processes. Basically, illustrative embodiments focus on testing only what is considered crucial and not testing everything in a given system. Consequently, illustrative embodiments provide processes to improve customer shipments and avoid lost revenue. Illustrative embodiments may either provide recommendations to production operators, which may then apply additional information not known to the illustrative embodiments, or may drive the MES or floor control system to force certain test optimizations to occur.

Figure 3:
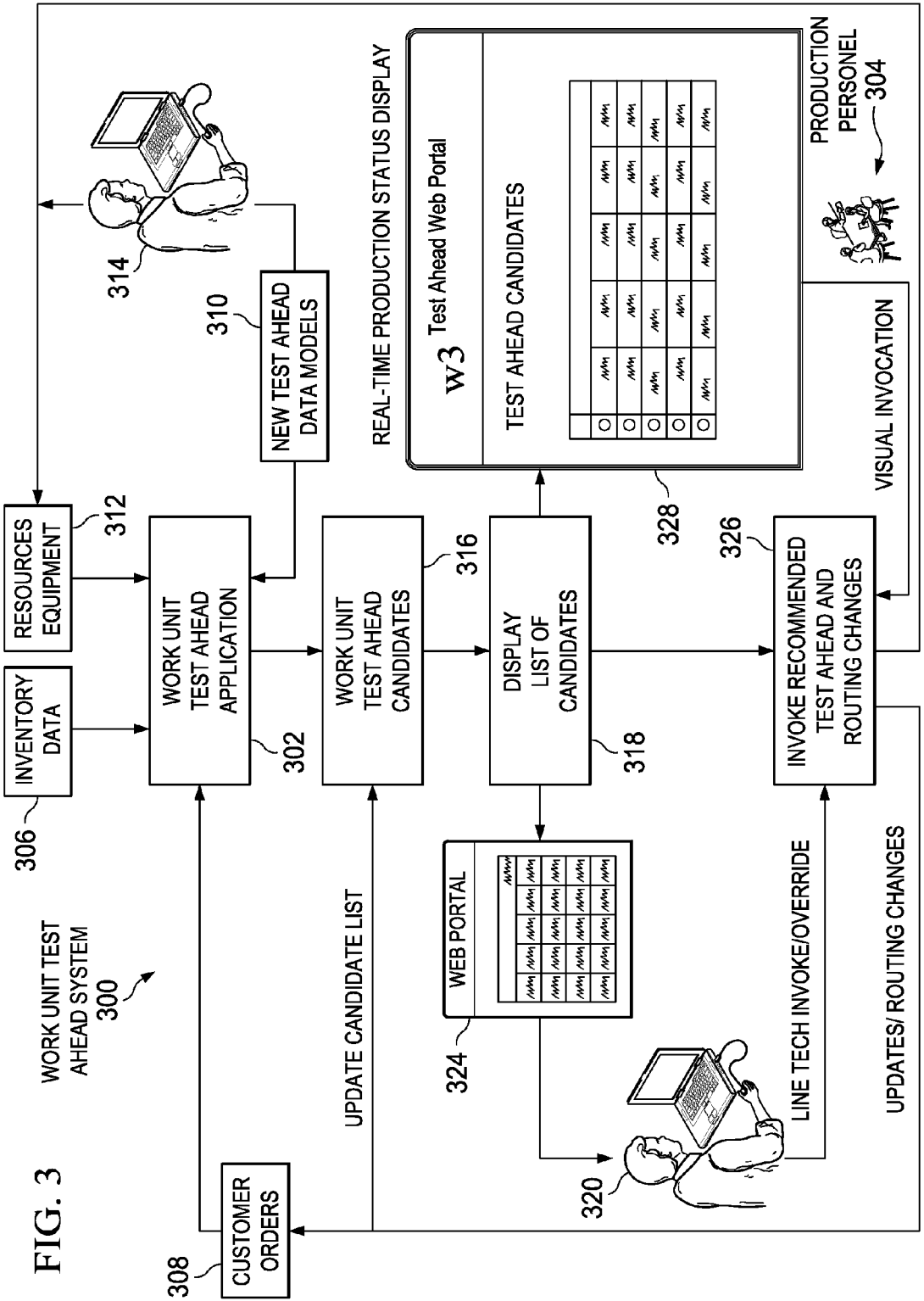
FIG. 3 is an exemplary illustration of a high-level diagram for a test ahead process in accordance with an illustrative embodiment.

With reference now to FIG. 3, an exemplary illustration of a high-level diagram for a test ahead process is depicted in accordance with an illustrative embodiment. Work unit test ahead system 300 may, for example, be implemented in network data processing system 100 in FIG. 1 or data processing system 200 in FIG. 2. Work unit test ahead system 300 includes work unit test ahead application 302. Work unit test ahead application 302 may, for example, be work unit test ahead application 218 in FIG. 2.

Work unit test ahead application 302 performs processes of illustrative embodiments on a predetermined time interval basis or on the occurrence of one or more manufacturing events. Work unit test ahead application 302 collects and analyzes production data from, for example, an MES, such as MES 216 in FIG. 2, to provide work unit test ahead optimization recommendations or to automatically implement work unit test ahead optimizations on the production line. The production data includes inventory data 306, customer orders 308, new test ahead data models 310, and resources/equipment 312. Customer orders 308 represent customer orders that are work-in-progress (WIP) and have one or more work units ready for test ahead operations. New test ahead data models 310 and resources/equipment 312 are provided by user 314. Resources/equipment 312 represent the resources and test equipment needed to perform test ahead processes for work units. User 314 may, for example, be a knowledgeable user, such as a system administrator or production engineer.

After collecting and analyzing the production data, work unit test ahead application 302 generates work unit test ahead candidates 316. Work unit test ahead candidates 316 are system candidates identified by work unit test ahead application 302 as being the most likely candidates to benefit from the performance of test ahead operations. Then, work unit test ahead application 302 displays the list of candidates at 318 to line technician 320. Line technician 320 is remotely located and views the list of candidates through Web portal 324. Subsequent to reviewing the candidate list on Web portal 324, line technician 320 may invoke test ahead routing changes or may override previous test ahead routing changes for one or more candidates based on recommendations made by work unit test ahead application 302 at 326.

Similarly, work unit test ahead application 302 displays the list of candidates to production personnel 304. Production personnel 304 are locally located on the production floor and view the list of candidates through real-time production status display 328. Production personnel 304 may invoke or override work unit routing changes at 326. In addition to, or instead of, displaying the list of candidates to line technician 320 and/or production personnel 304, work unit test ahead application 302 may automatically invoke or override test ahead routing changes at 326, itself. Further, work unit test ahead application 302 tracks the work unit test ahead routing changes and updates the candidate list based on its analysis.

Work unit test ahead application 302 monitors partially-completed customer orders and provides direction as to which completed work units should be tested ahead and which should wait for the required "system level" test to be started. Work unit test ahead application 302 provides the ability to: 1) interface production systems to monitor WIP and inventory status real time; 2) model "complexity" to apply as a criterion used to determine if a work unit will gain benefit by testing ahead; 3) model equipment/resources to ensure the dependent requirements are also considered in making a decision to test ahead work units; 4) incorporate projected part availability into the decision criteria for testing ahead; 5) rank scores of test ahead candidates to maximize test ahead activities and assets across customer orders; and 6) reset/change test ahead candidates and direction based on changing WIP, inventory, short parts, and changes in equipment/resource availability.

In addition, work unit test ahead application 302 optionally provides a user interface that graphically shows the status of WIP and any recommended actions, which may be updated on a real-time basis or on a regular time interval basis. The user interface may optionally allow adjustments to be made by specific users. For example, orders may be flagged, which may possibly be canceled, to place these orders on hold or to adjust the priority of these orders based on executive request prior to having this reflected in the production system. Also, the user interface may optionally force routing changes into the production system in order to force production personnel to execute a recommended test strategy for a given work unit.

Figure 4:
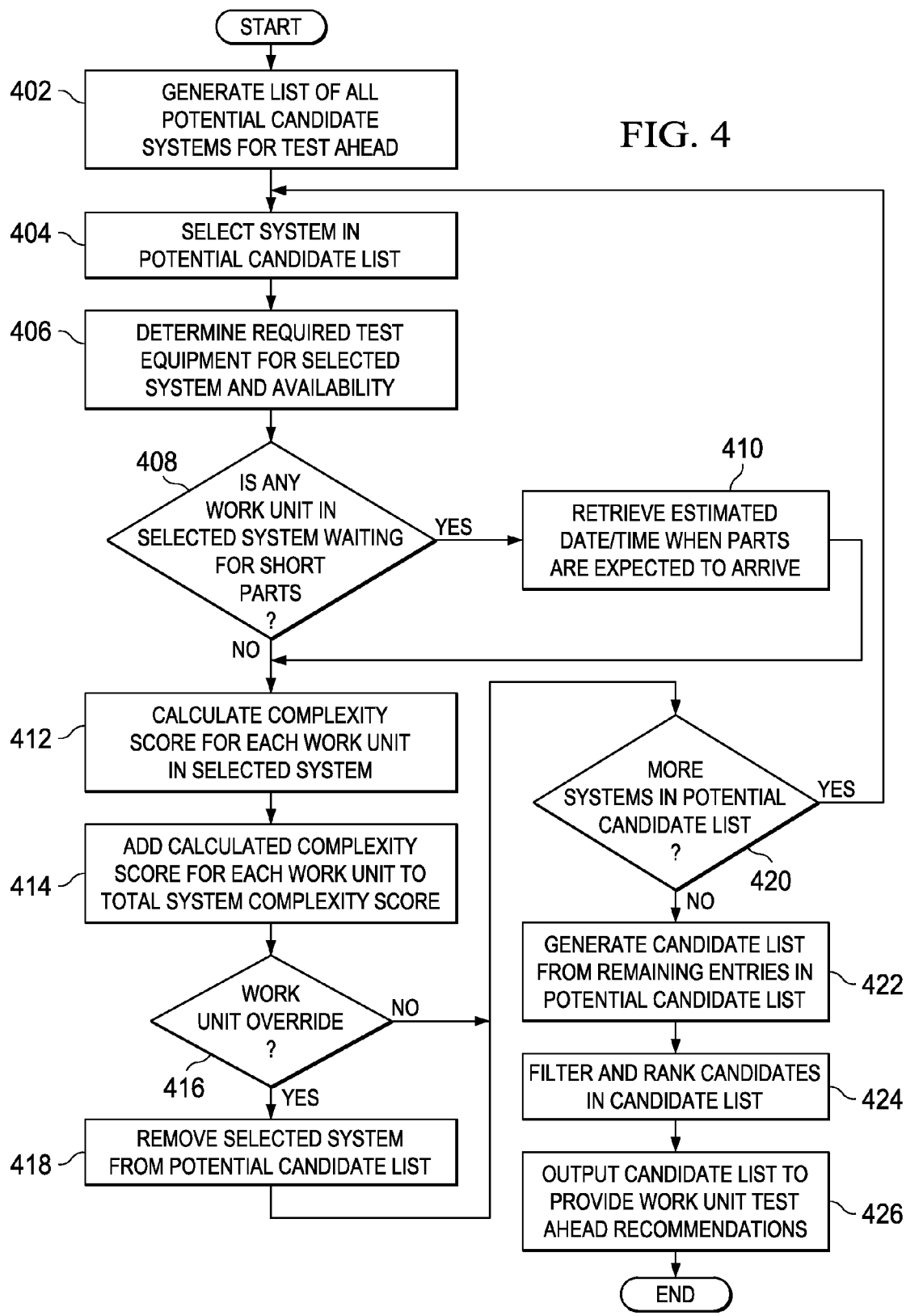
FIG. 4 is a flowchart illustrating an exemplary process for generating a work unit test ahead candidate list in accordance with an illustrative embodiment.

With reference now to FIG. 4, a flowchart illustrating an exemplary process for generating a work unit test ahead candidate list is shown in accordance with an illustrative embodiment. The process shown in FIG. 4 may be implemented in a work unit test ahead application, such as work unit test ahead application 218 in FIG. 2.

The process begins when the work unit test ahead application generates a list of all potential candidate systems for test ahead operations (step 402). The work unit test ahead application may generate this list of all potential candidate systems on a predetermined time interval basis or may generate the list in response to the occurrence of one or more manufacturing events. Also, the list of all potential candidate systems includes a list of all the components, or the content, within each of the potential candidate systems. The work unit test ahead application uses customer order data, such as customer orders 308 in FIG. 3, to determine WIP systems. In addition, the work unit test ahead application uses a work unit state data table, such as test ahead state table 226 in FIG. 2, to determine whether work units in the potential candidate systems are in a testable state or are ready for test ahead operations.

After generating the list of all potential candidate systems in step 402, the work unit test ahead application selects a system in the potential candidate list (step 404). Then, the work unit test ahead application determines the equipment or resources required to test the selected system (step 406). Also, the work unit test ahead application determines the availability of the required equipment or resources. The work unit test ahead application utilizes data contained in one or more tables, such as test equipment definition table 228 and test equipment location table 230 in FIG. 2, to make these equipment determinations.

Then, the work unit test ahead application makes a determination as to whether any work unit in the selected system is waiting for short parts (step 408). Short parts are parts that are currently unavailable or out of stock. If any work unit in the selected system is waiting for short parts, yes output of step 408, then the work unit test ahead application retrieves an estimated date and time when the currently unavailable parts are expected to arrive (step 410). The work unit test ahead application may use inventory data, such as inventory data 306 in FIG. 3, to obtain the part availability data. Thereafter, the process proceeds to step 412.

Figure 5:
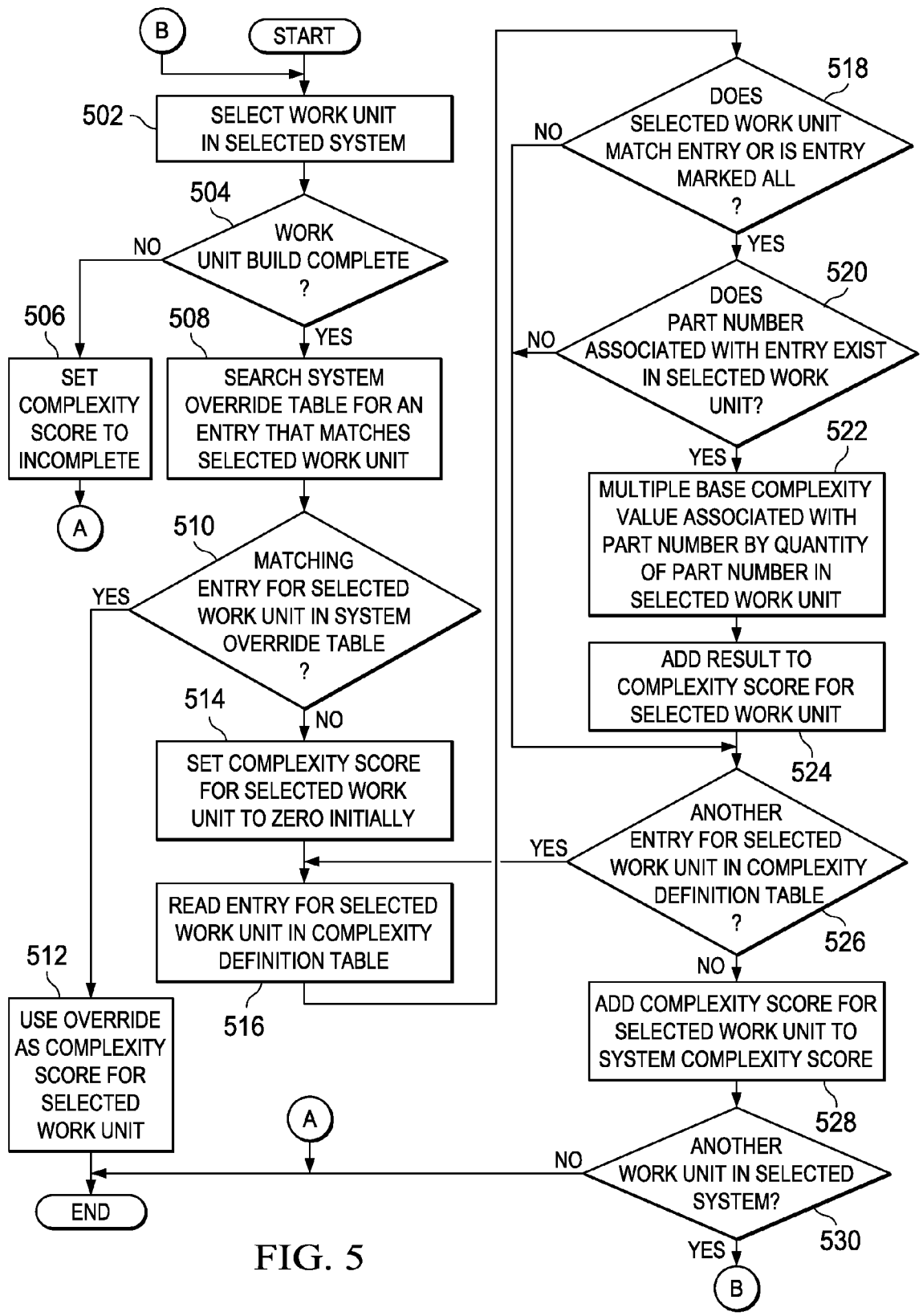
FIG. 5 is a flowchart illustrating an exemplary process for calculating a complexity score in accordance with an illustrative embodiment.

If no work units in the selected system are waiting for short parts, no output of step 408, then the work unit test ahead application calculates a complexity score for each work unit in the selected system (step 412). The process for calculating complexity scores for work units is shown in the example of FIG. 5. A complexity score is a score that reflects the relative complexity of a work unit. For example, generally the more parts that make up a particular work unit, the higher the complexity score will be for that particular work unit. In some cases, a single highly complex part in a work unit may drive that particular work unit to have a high complexity score. In general, the greater the probability problems may occur with a particular work unit or the greater opportunity to shorten the system test cycle time later, the higher the complexity score will be for that particular work unit.

Then, the work unit test ahead application adds the calculated complexity score for each of the work units in the selected system to a total complexity score for the selected system (step 414). Afterward, the work unit test ahead application makes a determination as to whether a work unit override exists (step 416). Complexity score override values for work units are found in an override table, such as system override table 222 in FIG. 2. The complexity score override values are used to override the calculated complexity scores for particular work units.

If a work unit override does not exist, no output of step 416, then the process proceeds to step 420. If a work unit override does exist, yes output of step 416, then the work unit test ahead application removes the selected system from the potential candidate list (step 418). In other words, the selected system was not a valid candidate for test ahead operations. Subsequently, the work unit test ahead application makes a determination as to whether more systems exist in the potential candidate list (step 420). If more systems do exist in the potential candidate list, yes output of step 420, then the process returns to step 404 where the work unit test ahead application selects another system in the potential candidate list. If more systems do not exist in the potential candidate list, no output of step 420, then the work unit test ahead application generates a candidate list from the remaining entries in the potential candidate list (step 422).

Figure 6B:
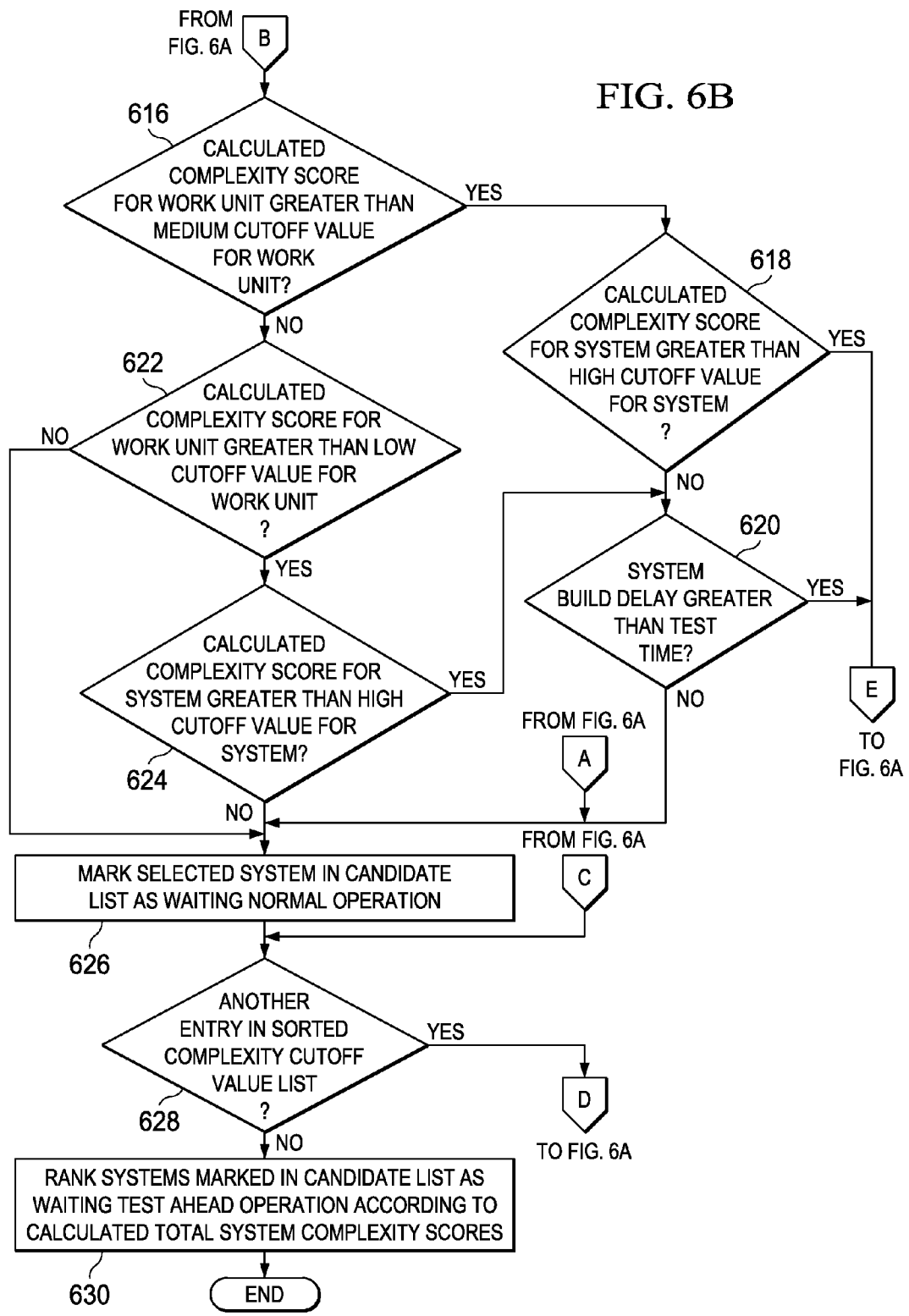

After generating the candidate list in step 422, the work unit test ahead application filters and ranks the candidates in the candidate list (step 424). The process for filtering and ranking the candidates in the candidate list is shown in the example of FIGS. 6A and 6B. Subsequently, the work unit test ahead application outputs the filtered and ranked candidate list to, for example, a Web portal and/or a real-time production status display, such as Web portal 324 and real-time production status display 328 in FIG. 3, to provide work unit test ahead recommendations to users, such as production personnel 304 or line technician 320 in FIG. 3 (step 426). In addition to, or instead of, outputting the candidate list, the work unit test ahead application may automatically implement the recommendations on a production line. The process terminates thereafter.

With reference now to FIG. 5, a flowchart illustrating an exemplary process for calculating a complexity score is shown in accordance with an illustrative embodiment. The process shown in FIG. 5 may be implemented in a work unit test ahead application, such as work unit test ahead application 218 in FIG. 2. Also, the process shown in FIG. 5 may be implemented in step 412 in FIG. 4.

The process begins when the work unit test ahead application selects a work unit in a selected system (step 502). Afterward, the work unit test ahead application makes a determination as to whether work unit build is complete for the selected work unit (step 504). If work unit build is not complete for the selected work unit, no output of step 504, then the work unit test ahead application sets a complexity score for the selected work unit to incomplete (step 506). Thereafter, the process terminates. If work unit build is complete for the selected work unit, yes output of step 504, then the work unit test ahead application searches a system override table, such as system override table 222 in FIG. 2, for an entry that matches the selected work unit (step 508). The system override table lists special conditions that typically eliminate a system from the test ahead pool of candidates.

Subsequently, the work unit test ahead application makes a determination as to whether a matching entry exists for the selected work unit in the system override table (step 510). If a matching entry does exist for the selected work unit in the system override table, yes output of step 510, then the work unit test ahead application uses the override value associated with the selected work unit as the complexity score for the selected work unit (step 512). Thereafter, the process terminates. If a matching entry does not exist for the selected work unit in the system override table, no output of step 510, then the work unit test ahead application sets the complexity score for the selected work unit to zero initially (step 514).

Then, the work unit test ahead application reads an entry for the selected work unit in a complexity definition table, such as complexity definition table 220 in FIG. 2 (step 516). Afterward, the work unit test ahead application makes a determination as to whether the selected work unit matches the entry or the entry is marked as all (step 518). If the selected work unit does not match the entry or the entry is not marked all, no output of step 518, then the process proceeds to step 526. If the selected work unit does match the entry or the entry is marked all, yes output of step 518, then the work unit test ahead application makes a determination as to whether a part number associated with the entry exists within the selected work unit (step 520).

If a part number associated with the entry does exist within the selected work unit, yes output of step 520, then the work unit test ahead application multiplies a base complexity value associated with the part number by a quantity of the part number within the selected work unit (step 522). Then, the work unit test ahead application adds the result of step 522 to a total complexity score for the selected work unit (step 524). Thereafter, the process proceeds to step 526. If a part number associated with the entry does not exist within the selected work unit, no output of step 520, then the work unit test ahead application makes a determination as to whether another entry for the selected work unit exists in the complexity definition table (step 526).

If another entry for the selected work unit does exist in the complexity definition table, yes output of step 526, then the process returns to step 516 where the work unit test ahead application reads the next entry for the selected work unit in the complexity definition table. If another entry for the selected work unit does not exist in the complexity definition table, no output of step 526, then the work unit test ahead application adds the total complexity score for the selected work unit to a total complexity score for the selected system (step 528). Subsequently, the work unit test ahead application makes a determination as to whether another work unit exists in the selected system (step 530). If another work unit does exist in the selected system, yes output of step 530, then the process returns to step 502 where the work unit test ahead application selects another work unit in the selected system. If another work unit does not exist in the selected system, no output of step 530, then the process terminates thereafter.

With reference now to FIG. 6A and FIG. 6B, a flowchart illustrating an exemplary process for filtering and ranking candidates is shown in accordance with an illustrative embodiment. The process shown in FIGS. 6A and 6B may be implemented in a work unit test ahead application, such as work unit test ahead application 218 in FIG. 2. Also, the process shown in FIGS. 6A and 6B may be implemented in step 424 in FIG. 4.

The process begins when the work unit test ahead application selects a system in the candidate list (step 602). Afterward, the work unit test ahead application makes a determination as to whether the selected system is within a clean runtime window for the end of quarter (EOQ) or other determined financial period (step 604). A clean runtime window is the time it takes for a system to run straight through testing operations without encountering any problems.

If the selected system is within a clean runtime window for the EOQ, yes output of step 604, then the process proceeds to step 626. If the selected system is not within a clean runtime window for the EOQ, no output of step 604, then the work unit test ahead application retrieves high/medium/low complexity cutoff values for the selected system from a system complexity cutoff table, such as system complexity cutoff table 224 in FIG. 2 (step 606). Afterward, the work unit test ahead application sorts the retrieved complexity cutoff values first by system complexity and then by work unit complexity to form a sorted complexity cutoff value list for the selected system (step 608).

Subsequently, the work unit test ahead application reads an entry in the sorted complexity cutoff value list (step 610). Then, the work unit test ahead application makes a determination as to whether a calculated complexity score for a work unit is greater than a high cutoff value for the work unit (step 612). If the calculated complexity score for the work unit is greater than the high cutoff value for the work unit, yes output of step 612, then the work unit test ahead application marks the selected system in the candidate list as waiting for test ahead operations (step 614). Thereafter, the process proceeds to step 628. If the calculated complexity score for the work unit is not greater than the high cutoff value for the work unit, no output of step 612, then the work unit test ahead application makes a determination as to whether the calculated complexity score for the work unit is greater than a medium cutoff value for the work unit (step 616).

If the calculated complexity score for the work unit is greater than the medium cutoff value for the work unit, yes output of step 616, then the work unit test ahead application makes a determination as to whether a calculated complexity score for the selected system is greater than a high cutoff value for the selected system (step 618). If the calculated complexity score for the selected system is greater than the high cutoff value for the selected system, yes output of step 618, then the process returns to step 614 where the work unit test ahead application marks the selected system in the candidate list as waiting for test ahead operations. If the calculated complexity score for the selected system is not greater than the high cutoff value for the selected system, no output of step 618, then the work unit test ahead application makes a determination as to whether a system build delay is greater than a time to functionally test the selected system (step 620). Typically, system build delay is time waiting for short parts to arrive. If the system build delay is greater than the time to functionally test the selected system, yes output of step 620, then the process returns to step 614 where the work unit test ahead application marks the selected system in the candidate list as waiting for test ahead operations. If the system build delay is not greater than the time to functionally test the selected system, no output of step 620, then the process proceeds to step 626.

Returning again to step 616, if the calculated complexity score for the work unit is not greater than the medium cutoff value for the work unit, no output of step 616, then the work unit test ahead application makes a determination as to whether the calculated complexity score for the work unit is greater than a low cutoff value for the work unit (step 622). If the calculated complexity score for the work unit is greater than the low cutoff value for the work unit, yes output of step 622, then the work unit test ahead application makes a determination as to whether the calculated complexity score for the selected system is greater than the high cutoff value for the selected system (step 624). If the calculated complexity score for the selected system is greater than the high cutoff value for the selected system, yes output of step 624, then the process returns to step 620 where the work unit test ahead application makes a determination as to whether the system build delay is greater than the time to functionally test the selected system. If the calculated complexity score for the selected system is not greater than the high cutoff value for the selected system, no output of step 624, then the process proceeds to step 626.

Returning again to step 622, if the calculated complexity score for the work unit is not greater than the low cutoff value for the work unit, no output of step 622, then the work unit test ahead application marks the selected system in the candidate list as waiting normal operations (step 626). Afterward, the work unit test ahead application makes a determination as to whether another entry exists in the sorted complexity cutoff value list (step 628). If another entry does exist in the sorted complexity cutoff value list, yes output of step 628, then the process returns to step 610 where the work unit test ahead application reads the next entry in the sorted complexity cutoff value list. If another entry does not exist in the sorted complexity cutoff value list, no output of step 628, then the work unit test ahead application ranks the systems marked in the candidate list as waiting for test ahead operations according to the calculated total system complexity scores (step 630). Ranking candidates means placing at the top of the candidate list those candidates having a highest complexity score and having all parts for test ahead operations to occur. The process terminates thereafter.

An exemplary work unit test ahead cutoff strategy may include a set of rules, such as, for example: 1) always test ahead high complexity work units, except when the system is complete and within a clean run time window when compared to EOQ or other financial period; 2) only test ahead middle complexity work units when a total system complexity is high or the system is delayed by short parts greater than the length of the test cycle; 3) only test ahead low complexity work units when the total system complexity is high and the system is delayed by short parts; and 4) never test zero complexity work units.

With reference now to FIG. 7, an exemplary illustration of a complexity definition table is depicted in accordance with an illustrative embodiment. Complexity definition table 700 may, for example, be complexity definition table 220 in FIG. 2. Complexity definition table 700 includes work unit 702, part number 704, base complexity value 706, and comments 708. Complexity definition table 700 defines a base complexity value associated with a particular part number, which is associated with a certain type of work unit. Work unit 702 lists different types of work units, which may be identified by, for example, different product IDs. Part number 704 lists part numbers associated with the work units. Base complexity value 706 lists base complexity values associated with the particular part numbers. Comments 708 list comments regarding test ahead operations for the listed work units. Base complexity value 706 and comments 708 are provided by a knowledgeable user, such as a production engineer or system administrator.

With reference now to FIG. 8, an exemplary illustration of a system override table is depicted in accordance with an illustrative embodiment. System override table 800 may, for example, be system override table 222 in FIG. 2. System override table 800 includes work unit 802, other product characteristics 804, order number 806, complexity score override 808, and comments 810. System override table 800 defines a complexity score override value associated with a particular customer order number, which is associated with a certain work unit. Work unit 802 may, for example, be work unit 702 in FIG. 7. Other product characteristics 804 list characteristics that "disqualify" a particular work unit from test ahead operations. These disqualifying characteristics may, for example, be a special product feature, part number, bill of materials (BOM), or content within the work unit. Order number 806 specifically identifies particular customer orders associated with each of the work units. Identification by specific customer order number allows processes of illustrative embodiments the ability to ensure that certain customer orders are handled according to comments 810. Complexity score override 808 lists override values that are used instead of a calculated complexity score for particular work units. Comments 810 may, for example, be comments 708 in FIG. 7. Complexity score override 808 and comments 810 also are provided by a knowledgeable user.

With reference now to FIG. 9, an exemplary illustration of a system complexity cutoff table is depicted in accordance with an illustrative embodiment. System complexity cutoff table 900 may, for example, be system complexity cutoff table 224 in FIG. 2. System complexity cutoff table 900 includes complexity level 902, minimum complexity score 904, and comments 906. System complexity cutoff table 900 defines minimum complexity scores associated with particular work unit and system complexity levels. Complexity level 902 lists work unit and system low, medium, and high complexity levels. Minimum complexity score 904 lists a minimum complexity score cutoff for each respective complexity level. In other words, a calculated complexity score for a work unit needs to be higher than the minimum complexity score cutoff in order for the work unit to be considered for test ahead operations. Comments 906 may, for example, be comments 708 in FIG. 7. Minimum complexity score 904 and comments 906 also are provided by a knowledgeable user.

With reference now to FIG. 10, an exemplary illustration of a test ahead state table is depicted in accordance with an illustrative embodiment. Test ahead state table 1000 may, for example, be test ahead state table 226 in FIG. 2. Test ahead state table 1000 defines a state of production for a particular work unit. Test ahead state table 1000 includes work unit 1002, state 1004, and comments 1006. Work unit 1002 and comments 1006 may, for example, be work unit 702 and comments 708 in FIG. 7. State 1004 lists the build state of the associated work unit. For example, state 1004 may list that a particular work unit is complete or waiting for a system test ahead operation.

With reference now to FIG. 11, an exemplary illustration of a test equipment definition table is depicted in accordance with an illustrative embodiment. Test equipment definition table 1100 may, for example, be test equipment definition table 228 in FIG. 2. Test equipment definition table 1100 defines the equipment required to test a particular work unit, along with the required test ahead cycle time for that particular work unit. Test equipment definition table 1100 includes work unit 1102, required equipment 1104, pretest cycle time 1106, and comments 1108. Work unit 1102 and comments 1108 may, for example, be work unit 702 and comments 708 in FIG. 7. Required equipment 1104 lists the equipment necessary to functionally test a particular work unit. Pretest cycle time 1106 lists the time required, listed in hours in this example, to test and debug a particular work unit.

With reference now to FIG. 12, an exemplary illustration of a test equipment location table is depicted in accordance with an illustrative embodiment. Test equipment location table 1200 may, for example, be test equipment location table 230 in FIG. 2. Test equipment location table 1200 defines the location of the required equipment to test a particular work unit. Test equipment location table includes required equipment 1202, test cell 1204, and comments 1206. Required equipment 1202 may, for example, be required equipment 1104 in FIG. 11. Test cell 1204 lists the location and availability of the test cell. Comments 1206 may, for example, be comments 708 in FIG. 7. Illustrative embodiments use test equipment definition table 1100 in FIG. 11 and test equipment location table 1200 to ensure that the required prerequisite equipment and test locations are available for a desired work unit test ahead operation.

Thus, illustrative embodiments of the present invention provide a computer implemented method, system, and computer program product for providing real-time test ahead work direction to optimize manufacturing of customer orders. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the prin-

What is claimed is:

1. A computer implemented method for generating a physical work unit test ahead candidate list, the computer implemented method comprising:

generating, by a computer, a list of all potential physical candidate systems for test ahead operations to form a potential candidate list, wherein a physical work unit test ahead operation functionally tests a physical work unit that is to be included in a physical system prior to the physical work unit being incorporated into the physical system saving defect correction time by isolating defects before a runtime of the physical system;

selecting, by the computer, a physical system in the potential candidate list to form a selected physical system;

determining, by the computer, required test equipment for the selected physical system and a location and availability of the required test equipment;

determining, by the computer, whether any physical work unit in the selected physical system is waiting on short parts that are currently out of stock to arrive;

responsive to determining, by the computer, that no physical work unit in the selected physical system is waiting on short parts that are currently out of stock to arrive, calculating, by the computer, a complexity score for each physical work unit in the selected physical system to form a calculated complexity score for each physical work unit;

adding, by the computer, the calculated complexity score for each physical work unit to a total physical system complexity score for the selected physical system;

determining, by the computer, whether a complexity score override value used to override calculated complexity scores for physical work units exists for a physical work unit in the selected physical system;

responsive to determining, by the computer, that a complexity score override value used to override calculated complexity scores for physical work units does exist for a physical work unit in the selected physical system, removing, by the computer, the selected physical system from the potential candidate list;

generating, by the computer, a candidate list from remaining physical systems in the potential candidate list; and outputting, by the computer, the candidate list to provide recommendations for optimizing physical work unit test ahead operations in a production line.

2. The computer implemented method of claim 1, further comprising:

filtering, by the computer, physical systems in the candidate list; and ranking, by the computer, the physical systems marked as waiting for test ahead operations according to calculated total physical system complexity scores, wherein the physical systems with a highest calculated total physical system complexity score is placed at a top of the candidate list.

3. The computer implemented method of claim 1, wherein the calculating, by the computer, the complexity score for each physical work unit in the selected physical system further includes:

selecting, by the computer, a physical work unit in the selected physical system to form a selected physical work unit;

determining, by the computer, whether a build is complete for the selected physical work unit;

responsive to determining, by the computer, that the build is complete for the selected physical work unit, setting, by the computer, an initial complexity score for the selected physical work unit to zero;

determining, by the computer, whether a part number associated with an entry in a complexity definition table for the selected physical work unit exists in the selected physical work unit;

responsive to determining, by the computer, that a part associated with an entry in a complexity definition table for the selected physical work unit does exist in the selected physical work unit, multiplying, by the computer, a base complexity value associated with the part by a quantity of the part in the selected physical work unit;

adding, by the computer, a multiplication result to a complexity score for the selected physical work unit; and adding, by the computer, the complexity score for the selected physical work unit to a physical system complexity score.

4. The computer implemented method of claim 2, wherein the filtering, by the computer, the physical systems in the candidate list further includes:

selecting, by the computer, a physical system in the candidate list;

determining, by the computer, whether the physical system is within a clean runtime window for a financial period;

responsive to determining, by the computer, that the physical system is not within the clean runtime window for the financial period, retrieving, by the computer, complexity score cutoff values for the physical system;

determining, by the computer, whether a calculated complexity score for a physical work unit is greater than the complexity score cutoff values for the physical system;

responsive to determining, by the computer, that a calculated complexity score for a physical work unit is greater than the complexity score cutoff values for the physical system, marking, by the computer, the physical system in the candidate list as waiting for the test ahead operations; and responsive to determining, by the computer, that a calculated complexity score for a physical work unit is not greater than the complexity score cutoff values for the physical system, marking, by the computer, the physical system in the candidate list as waiting for normal operations.

5. The computer implemented method of claim 1, wherein the recommendations for optimizing the physical work unit test ahead operations in the production line are automatically implemented in the production line by a work unit test ahead application, and wherein the work unit test ahead application is included in a manufacturing execution system.

6. The computer implemented method of claim 1, wherein the physical work unit is one of an assembly or a sub-assembly that includes a plurality of parts, and wherein a plurality of physical work units comprise a complete physical system.

7. A computer system for generating a physical work unit test ahead candidate list, the computer system comprising:

a bus system;

a storage device connected to the bus system, wherein the storage device stores a set of instructions; and a processing unit connected to the bus system, wherein the processing unit executes the set of instructions to generate a list of all potential physical candidate systems for test ahead operations to form a potential candidate list, wherein a physical work unit test ahead operation functionally tests a physical work unit that is to be included in a physical system prior to the physical work unit being incorporated into the physical system saving defect correction time by isolating defects before a runtime of the physical system; select a physical system in the potential candidate list to form a selected physical system; determine required test equipment for the selected physical system and a location and availability of the required test equipment; determine whether any physical work unit in the selected physical system is waiting on short parts that are currently out of stock to arrive; calculate a complexity score for each physical work unit in the selected physical system to form a calculated complexity score for each physical work unit in response to determining that no physical work unit in the selected physical system is waiting on short parts that are currently out of stock to arrive; add the calculated complexity score for each physical work unit to a total physical system complexity score for the selected physical system; determine whether a complexity score override value used to override calculated complexity scores for physical work units exists for a physical work unit in the selected physical system; remove the selected physical system from the potential candidate list in response to determining that a complexity score override value used to override calculated complexity scores for physical work units does exist for a physical work unit in the selected physical system; generate a candidate list from remaining physical systems in the potential candidate list; and output the candidate list to provide recommendations for optimizing physical work unit test ahead operations in a production line.

8. The computer system of claim 7, wherein the processing unit executes a further set of instructions to filter physical systems in the candidate list; and rank the physical systems marked as waiting for test ahead operations according to calculated total physical system complexity scores, wherein the physical systems with a highest calculated total physical system complexity score is placed at a top of the candidate list.

9. The computer system of claim 7, wherein the recommendations for optimizing the physical work unit test ahead operations in the production line are automatically implemented in the production line by a work unit test ahead application, and wherein the work unit test ahead application is included in a manufacturing execution system.

10. A computer program product stored in a non-transitory computer readable storage device having computer usable program code embodied therein that is executable by a computer for generating a physical work unit test ahead candidate list, the computer program product comprising:

computer usable program code for generating a list of all potential physical candidate systems for test ahead operations to form a potential candidate list, wherein a physical work unit test ahead operation functionally tests a physical work unit that is to be included in a physical system prior to the physical work unit being incorporated into the physical system saving defect correction time by isolating defects before a runtime of the physical system;

computer usable program code for selecting a physical system in the potential candidate list to form a selected physical system;

computer usable program code for determining required test equipment for the selected physical system and a location and availability of the required test equipment;

computer usable program code for determining whether any physical work unit in the selected physical system is waiting on short parts that are currently out of stock to arrive;

computer usable program code for calculating a complexity score for each physical work unit in the selected physical system to form a calculated complexity score for each physical work unit in response to determining that no physical work unit in the selected physical system is waiting on short parts that are currently out of stock to arrive;

computer usable program code for adding the calculated complexity score for each physical work unit to a total physical system complexity score for the selected physical system;

computer usable program code for determining whether a complexity score override value used to override calculated complexity scores for physical work units exists for a physical work unit in the selected physical system;

computer usable program code for removing the selected physical system from the potential candidate list in response to determining that a complexity score override value used to override calculated complexity scores for physical work units does exist for a physical work unit in the selected physical system;

computer usable program code for generating a candidate list from remaining physical systems in the potential candidate list; and computer usable program code for outputting the candidate list to provide recommendations for optimizing physical work unit test ahead operations in a production line.

11. The computer program product of claim 10, further comprising:

computer usable program code for filtering physical systems in the candidate list; and computer usable program code for ranking the physical systems marked as waiting for test ahead operations according to calculated total physical system complexity scores, wherein the physical systems with a highest calculated total physical system complexity score is placed at a top of the candidate list.

12. The computer program product of claim 10, wherein the computer usable program code for calculating the complexity score for each physical work unit in the selected physical system further includes:

computer usable program code for selecting a physical work unit in the selected physical system to form a selected physical work unit;

computer usable program code for determining whether a build is complete for the selected physical work unit;

computer usable program code for setting an initial complexity score for the selected physical work unit to zero in response to determining that the build is complete for the selected physical work unit;

computer usable program code for determining whether a part number associated with an entry in a complexity definition table for the selected physical work unit exists in the selected physical work unit;

computer usable program code for multiplying a base complexity value associated with a part by a quantity of the part in the selected physical work unit in response to determining that the part associated with an entry in a complexity definition table for the selected physical work unit does exist in the selected physical work unit;

computer usable program code for adding a multiplication result to a complexity score for the selected physical work unit; and computer usable program code for adding the complexity score for the selected physical work unit to a physical system complexity score.

13. The computer program product of claim 11, wherein the computer usable program code for filtering the physical systems in the candidate list further includes:
    computer usable program code for selecting a physical system in the candidate list;
    computer usable program code for determining whether the physical system is within a clean runtime window for a financial period;
    computer usable program code for retrieving complexity score cutoff values for the physical system in response to determining that the physical system is not within the clean runtime window for the financial period;
    computer usable program code for determining whether a calculated complexity score for a physical work unit is greater than the complexity score cutoff values for the physical system;
    computer usable program code for marking the physical system in the candidate list as waiting for the test ahead operations in response to determining that a calculated complexity score for a physical work unit is greater than the complexity score cutoff values for the physical system; and
    computer usable program code for marking the physical system in the candidate list as waiting for normal operations in response to determining that a calculated complexity score for a physical work unit is not greater than the complexity score cutoff values for the physical system.

14. The computer program product of claim 10, wherein the recommendations for optimizing the physical work unit test ahead operations in the production line are automatically implemented in the production line by a work unit test ahead application, and wherein the work unit test ahead application is included in a manufacturing execution system.

15. The computer program product of claim 10, wherein the physical work unit is one of an assembly or a sub-assembly that includes a plurality of parts, and wherein a plurality of physical work units comprise a complete physical system.

* * * * *